United States Patent [19]

Higgins et al.

[11] Patent Number: 5,019,430

[45] Date of Patent: May 28, 1991

[54] METHOD OF PRODUCING A SILICON CARBIDE-BASED BODY

[75] Inventors: Ian Higgins, Preston; Andrew Baxendale, Up Holland, both of United Kingdom

[73] Assignee: United Kingdom Atomic Energy Authority, London, England

[21] Appl. No.: 431,209

[22] Filed: Nov. 3, 1989

[30] Foreign Application Priority Data

Nov. 10, 1988 [GB] United Kingdom ............... 8826299
Mar. 20, 1989 [GB] United Kingdom ............... 8906342

[51] Int. Cl.$^5$ ............................................. C04B 35/56
[52] U.S. Cl. ............................ 427/430.1; 427/443.2; 427/376.2; 427/397.7; 427/431; 501/87; 501/88; 501/91; 501/93; 264/56; 264/62
[58] Field of Search ................ 427/430.1, 431, 397.7, 427/376.2, 443.2; 264/62, 56; 501/87, 88, 91, 93

[56] References Cited

U.S. PATENT DOCUMENTS

| | | | |
|---|---|---|---|
| 3,859,399 | 1/1975 | Bailey et al. | 501/91 |
| 4,477,493 | 10/1984 | Parkinson et al. | 427/430.1 |
| 4,626,516 | 12/1986 | Morelock | 501/92 |
| 4,737,328 | 4/1988 | Morelock | 264/62 |
| 4,753,763 | 6/1988 | Tanaka et al. | 264/62 |
| 4,891,338 | 1/1990 | Gesing et al. | 501/91 |

OTHER PUBLICATIONS

Messner et al., Ceram. Eng. Sci. Proc., 9(7-8) pp. 1052-1060(1988), "Processing of Reaction-Bonded Silicon Carbide Without Residual Silicon Phase".

Primary Examiner—Michael Lusignan
Assistant Examiner—Diana L. Dudash
Attorney, Agent, or Firm—William R. Hinds

[57] ABSTRACT

A method of producing a silicon carbide-based body by infiltrating with molten silicon a porous compact comprising silicon carbide, carbon, and a secondary phase dispersed within the compact. The secondary phase might comprise a titanium compound, or a metal carbide.

11 Claims, No Drawings

METHOD OF PRODUCING A SILICON CARBIDE-BASED BODY

This invention relates to the production of a silicon carbide-based body.

In one known method of producing a silicon carbide body and known as reaction sintering, a silicon carbide and carbon powder porous compact is infiltrated with molten silicon. Information on such known method is described, for example, in a paper "The Properties of Self-Bonded Silicon Carbide Bodies" by C. W. Forrest, P. Kennedy, and J. V. Shennan, published in "Special Ceramics 5" June 1972 by The British Ceramics Research Association, Queens Road, Penkhull, Stoke-on-Trent, United Kingdom,. and in European patent specification No. 0093532 (U.S. Pat. No. 4,477,493) which are incorporated by reference herein.

It is an object of the present invention to provide a method of producing silicon carbide-based bodies having improved properties.

According to the present invention, a method of producing a body comprising silicon carbide comprises infiltrating with molten silicon a porous compact comprising silicon carbide and carbon so that the silicon reacts with the carbon, the compact including a secondary phase dispersed within the compact, the secondary phase comprising a titanium compound having a particle size between 5 and 30 $\mu$m. The secondary phase titanium compound may comprise $TiB_2$, or TiN, desirably in amounts arranged to provide about 15 v/o thereof in the body so formed.

Also according to the present invention, a method of producing a body comprising silicon carbide comprises infiltrating with molten silicon a porous compact comprising silicon carbide and carbon, wherein the improvement comprises a metal carbide dispersed within the compact, the particle size and quantity of the metal carbide being selected so that substantially all of the silicon reacts with the carbon and with the metal carbide to form silicon carbide and silicide of the metal, whereby the body is produced having substantially no free silicon therein.

The secondary phase metal carbide may comprise a secondary metal carbide that dissolves at least to a substantial extent in the molten silicon. The secondary metal carbide may comprise boron carbide, zirconium carbide, titanium carbide, molybdenum carbide, or tantalum carbide.

The carbon is desirably in the form of carbon powder, although other finely divided forms may be used.

Preferably, the secondary phase comprises grains of mean particle size of between 5 $\mu$m and 30 $\mu$m.

The invention will now be further described by way of example only with reference to the following examples:

EXAMPLE I

| Cylindrical green compact | 1.9 cm diameter × 1.3 cm long. |
|---|---|
| Composition (by volume) | 36% silicon carbide |
| | 15% $TiB_2$ (grains ~5 $\mu$m) |
| | 18% Carbon |
| | 31% Porosity |

The compact was infiltrated with pure silicon at about 1650° C. The consolidated body was dense with negligible volume expansion from the volume of the original compact.

EXAMPLE II

Example I was repeated but using TiN grains of mean particle size 5 $\mu$M instead of $TiB_2$, with similar results. In order to inhibit the TiN grains from reacting with molten silicon, an external nitrogen gas partial pressure of at least $8 \times 10^{-3}$ atmospheres is advisable.

EXAMPLE III

Cylindrical green compact—1.9 cm diameter × 1.3 cm long

Composition (by volume)—36% silicon carbide, 14% boron carbide (grains ~ 200 $\mu$m $B_4C$), 18% carbon, 32% porosity The compact was infiltrated with pure silicon at about 1650° C. Rather unexpectedly the consolidated body produced was dense with negligible volume expansion from the volume of the original compact. The theoretical final composition by volume of the consolidated body should be:

| ORIGINAL IN COMPACT | | NEW FROM INFILTRATION |
|---|---|---|
| 36% silicon carbide | + | 42% silicon carbide |
| 14% boron carbide | | 8% silicon |

In practice the composition was close to the theoretical but contained a low percentage of boron silicide.

The presence of the secondary phase in the consolidated bodies is expected to improve the strength and fracture toughness of the bodies. The particle size of the secondary phase is likely to be in the range 5 to 30 $\mu$m for optimum mechanical properties of the body, although too small a particle size may lead to the secondary phase dissolving in the molten silicon. In fact, by controlling the proportions of the silicon carbide, the particle size and selection of the secondary phase, the carbon, and the porosity in the compact, a dense body with little volume change from the compact may be obtained. This may be represented, for example, by:

Compact = SiC + MC + C (where MC = secondary carbide)

After silicon infiltration:

| body = | original SiC |
|---|---|
| | new SiC (from reaction between Si and C) |
| | new SiC (from reaction between Si and MC) |
| | metal silicide (from reaction between Si and MC) |
| | residual secondary carbide (unless secondary carbide fully dissolved in the molten silicon) |

Zirconium carbide, titanium carbide, tantalum carbide, boron carbide, and molybdenum carbide, are examples of secondary phases that will dissolve in molten silicon as required above.

It will be understood that the invention includes a silicon carbide-based body made by the method of the invention.

We claim:

1. A method of producing a body comprising silicon carbide, the method comprising, infiltrating with molten silicon a porous compact comprising silicon carbide and carbon so that the silicon reacts with the carbon, the compact including a secondary phase dispersed within the compact, the secondary phase comprising a titanium compound having a particle size between 5 and 30 μm.

2. A method as claimed in claim 1, wherein the titanium compound comprises $TiB_2$, or TiN.

3. A method as claimed in claim 2, wherein the titanium compound comprises TiN, and the method is performed in a nitrogen gas partial pressure of at least $8 \times 10^{-3}$ atmospheres.

4. A method as claimed in claim 2, wherein the method is performed at a temperature of about 1650° C.

5. A method as claimed in claim 1, wherein the compact comprises about, 36 percent by volume silicon carbide, 18 percent by volume carbon, and 14 to 15 percent by volume titanium compound, has a porosity between 31 and 32 percent by volume, and the titanium compound has a particle size between 5 and 30 μm.

6. A method of producing a body comprising silicon carbide, the method comprising infiltrating with molten silicon a porous compact comprising silicon carbide and carbon, wherein the improvement comprises a metal carbide dispersed within the compact, the particle size and quantity of the metal carbide being selected so that substantially the silicon reacts with all of the carbon and with the metal carbide to form silicon carbide and silicide of said metal, whereby the body is produced having substantially no free silicon therein.

7. A method as claimed in claim 6, wherein the metal carbide is selected from the group consisting of: zirconium carbide, titanium carbide, tantalum carbide, boron carbide, and molybdenum carbide.

8. A method as claimed in claim 1, wherein the carbon comprises carbon powder.

9. A silicon carbide-based body produced by the method as claimed in claim 1.

10. A method as claimed in claim 6 wherein the metal carbide comprises boron carbide having a particle size of about 200 μm.

11. A method as claimed in claim 6 wherein the quantity and particle size of the metal carbide and the quantity of the molten silicon is such that the metal carbide fully dissolves in the molten silicon.

* * * * *